(12) United States Patent
Frank (10) Patent No.: US 7,322,770 B2
(45) Date of Patent: Jan. 29, 2008

(54) JOINT ARRANGEMENT FOR DEMOUNTABLE STRUCTURE

(75) Inventor: Manfred Johannes Frank, Auckland (NZ)

(73) Assignee: Manfred Frank Patent Holdings Limited, Auckland (NZ)

( * ) Notice: Subject to any disclaimer, the term of this patent is extended or adjusted under 35 U.S.C. 154(b) by 0 days.

(21) Appl. No.: 10/381,972

(22) PCT Filed: Sep. 28, 2001

(86) PCT No.: PCT/NZ01/00201

§ 371 (c)(1),
(2), (4) Date: Jul. 17, 2003

(87) PCT Pub. No.: WO02/26086

PCT Pub. Date: Apr. 4, 2002

(65) Prior Publication Data

US 2004/0009031 A1    Jan. 15, 2004

(30) Foreign Application Priority Data

Sep. 28, 2000    (NZ) .................................... 507215

(51) Int. Cl.
*F16B 9/02* (2006.01)

(52) U.S. Cl. ........................................ 403/253; 52/275

(58) Field of Classification Search ........... 403/205, 403/231, 295, 382, 401–403, 381; 220/616, 220/621; 312/140, 257.1; 52/280, 238.1, 52/36.1, 239, 275, 481.2, 279; D25/121, D25/136

See application file for complete search history.

(56) References Cited

U.S. PATENT DOCUMENTS

| 125,844 | A | * | 4/1872 | Rice ...................... D25/121 X |
| 1,032,674 | A | * | 7/1912 | Holland ...................... 403/381 |
| 2,144,630 | A | * | 1/1939 | Kotrbaty ........................ 52/275 |
| 3,359,022 | A | * | 12/1967 | Russell ................... 52/238.1 X |
| 3,380,768 | A | * | 4/1968 | Wolfensberger ......... 403/205 X |
| 3,381,430 | A | * | 5/1968 | Wiczer |
| 3,416,275 | A | * | 12/1968 | Van Loghem et al. |
| 3,866,381 | A | * | 2/1975 | Eschbach et al. |
| 3,876,270 | A | * | 4/1975 | White |

(Continued)

FOREIGN PATENT DOCUMENTS

JP    07292806    11/1995

(Continued)

*Primary Examiner*—Greg Binda
(74) *Attorney, Agent, or Firm*—Blakely, Sokoloff Taylor & Zafman (57) ABSTRACT

A joint arrangement between adjacent edges of structural elements each including a face surface and a rear surface with a profiled edge extending between the face and rear surfaces. The profiled edge forms a shoulder spaced from both the face and rear surfaces. The joint arrangement including a recess in the front surface of each structural element. The recess being adjacent the profiled edge. An elongate joiner element having projections is included. A first projection being engaged in the recess in a first structural element and a second projection engaged in the recess of a second structural element. The elongate joiner element further including a spine located within an area between the profiled edges of the first and second structural elements. A lateral projection projects from the spine and is engaged behind the shoulder relative to the face surface of the first structural element.

32 Claims, 7 Drawing Sheets

U.S. PATENT DOCUMENTS

| | | | | |
|---|---|---|---|---|
| 4,332,119 A | * | 6/1982 | Toews | 52/481.2 |
| 4,527,370 A | * | 7/1985 | Schuette | |
| 4,712,942 A | * | 12/1987 | Brown | 403/231 X |
| 4,840,440 A | * | 6/1989 | Dieter | 312/140 |
| 4,907,388 A | * | 3/1990 | Siahatgar | 52/481.2 |
| 5,058,333 A | * | 10/1991 | Schwartz | |
| 5,398,468 A | * | 3/1995 | Erickson | 52/36.1 X |
| 6,375,284 B1 | * | 4/2002 | Frank | |

FOREIGN PATENT DOCUMENTS

| | | | |
|---|---|---|---|
| WO | WO 99/02071 | | 1/1999 |
| WO | WO 99/08575 | * | 2/1999 |

* cited by examiner

JOINT ARRANGEMENT FOR DEMOUNTABLE STRUCTURE

The present application is a National Stage application of International Application No. PCT/NZ01/00201, filed Sep. 28, 2001.

BACKGROUND

1. Field

This invention relates to improvements in demountable structures such as cabinets which can be used for display purposes and to a joint arrangement for use in demountable structures.

2. Description of Related Art

In our U.S. Pat. No. 6,375,284 there is disclosed a cabinet which is demountable. The cabinet has walls which are joined edge to edge by joiner elements. At the apex of each intersection of the walls there is a retainer. The retainers prevent the joiner elements from being removed. One of the retainers which is the last to be installed when the cabinet is assembled is lockable. This lockable retainer needs to be unlocked and removed before any of the other joiner elements and retainer elements can be removed so as to disassemble or demount the cabinet.

The cabinet according to WO 99/08575, which has an English equivalent of U.S. Pat. No. 6,375,284, has been extremely successful especially in the museum environment. One of the attributes of the cabinet is that it can be assembled around the object or objects to be displayed. This is particularly useful where the object is large and would otherwise be difficult to engage an assembled cabinet over the object(s). Thus the object can be placed on one side of the cabinet and then the remainder of the cabinet assembled around the object by progressively positioning the sides and top panels edge to edge, insertion of the joiner elements and the retainers.

The cabinet of U.S. Pat. No. 6,375,284 also exhibits good strength characteristics when assembled. This is despite the fact that the walls are joined edge to edge by a joiner element of overall small cross sectional dimensions.

According to the invention of U.S. Pat. No. 6,375,284 the edges of the walls are profiled and the joiner element has a cross sectional profile which is slid on to the adjacent profiled wall edges (the panels being located at right angles to one another). As a result the joiner element couples the profiled edges together to provide a sound and secure manner. This has worked successfully, however, we have now developed further the joiner element and the profiles of the edges such that assembly of the joint between panels is further facilitated by making it easier to slide the joiner element on to the profiled edges of the adjacent wall panels. Also a stronger join is achieved.

SUMMARY

Broadly in one aspect of the invention there is provided a joint arrangement between adjacent edges of first and second structural elements each of which includes a face surface and a rear surface with the profiled edge extending between the face and rear surfaces, said edge being of a profile which forms a shoulder spaced from both the face and rear surfaces, the joint arrangement including a recess in the front surface of each structural element said recess being adjacent the profiled edge thereof, an elongate joiner element which has first and second projections the first projection being engaged in the recess in the first structural element and the second projection engaged in the recess of the second structural element, the elongate joiner element further including a spine which is located within an area between the profiled edges of the first and second structural elements, a lateral projection projecting from the spine and engaged behind the should relative to the face surface of the first structural element.

According to a second broad aspect of the invention there is a provided joint arrangement between adjacent profiled edges of two structural elements, the joint arrangement including a joiner element which has projections, each engageable in a groove in a respective of the structural elements, the joiner element further having a spine which is located between the profiled edges of the structural elements and the spine includes at least one lateral projection which is engaged in a groove formed in a profiled edge.

In a third broad aspect of the invention there is provided a demountable case including panels, the panels being joined edge to edge by joint arrangements of the type as defined in the first and second broad aspects set forth above. The joiner elements being retained against sliding movement by a retainer element located in each corner of the display case at which the ends of at least two joiner elements are located.

DETAILED DESCRIPTION

The following describes and illustrates particular embodiments to the present invention. It will be appreciated by those skilled in the art that other variations and combinations in shape and configuration may be possible without departing from the scope of the invention.

The content of U.S. Pat. No. 6,375,284, which is the English equivalent of WO 99/08575, is hereby incorporated by reference in its entirety.

Figure 12:
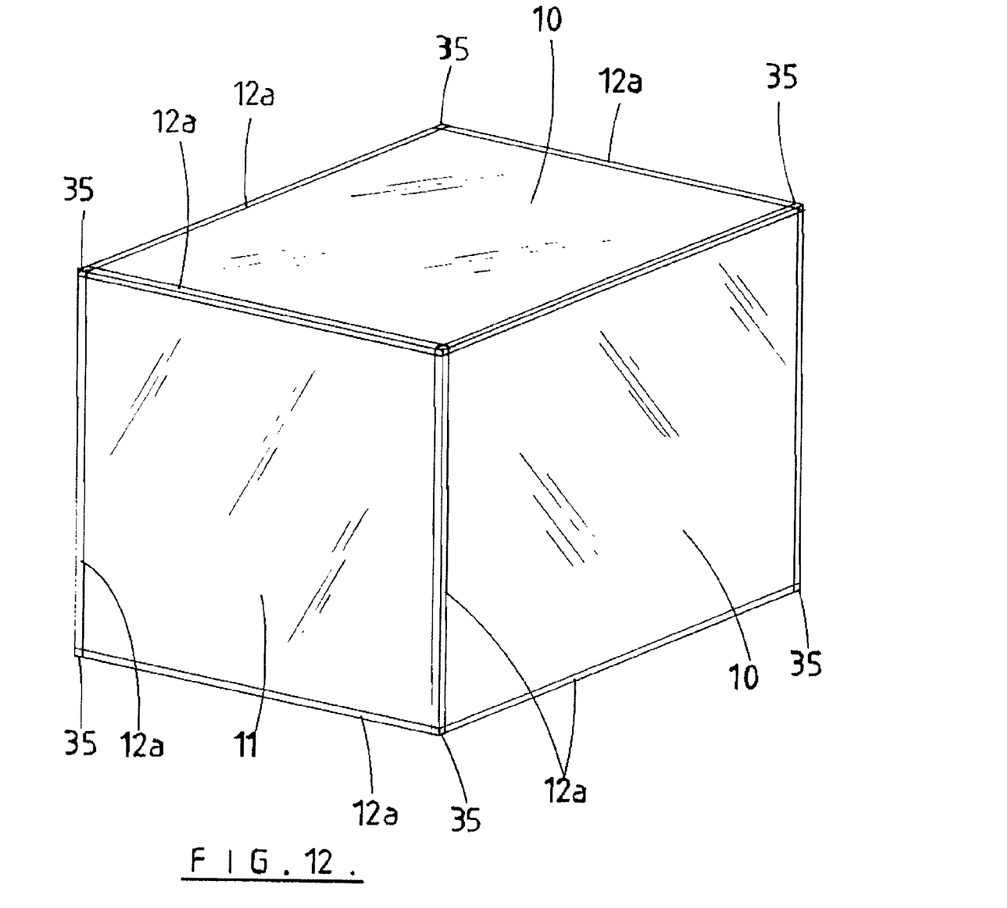
FIG. 12 is a perspective view of a demountable structure incorporating the joint arrangement of FIG. 1.

In its simplest form a demountable structure to which the joint arrangement of the present invention applies will be described as a cabinet. The cabinet can comprise a plurality of side walls, a bottom or base wall and a top wall as shown in FIG. 12 and as is disclosed in U.S. Pat. No. 6,375,284. The panel members 10 and 11 are joined edge to edge at their peripheral edges by elongate joiner elements 12a, there being one elongate joiner element for each pair of adjacent edges as is described in U.S. Pat. No. 6,375,284. The present invention thus relates specifically to the form and construction of the edges of the panel members and the joiner element. For this reason the drawings accompanying the present specification relate to these aspects of construction.

Figure 1:
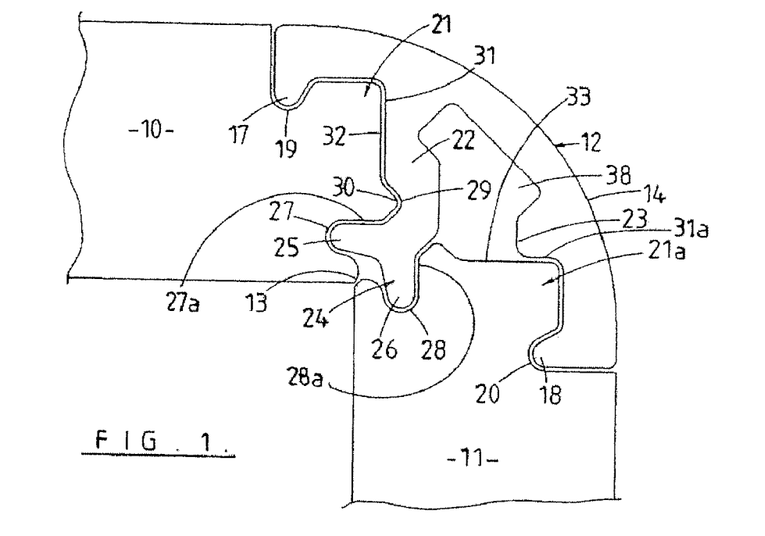
FIG. 1 is a cross sectional view of a pair of panel elements joined together by a joiner element according to one form of the invention.

FIG. 1 shows in cross section a part length of each of panels 10 and 11. The panels are in the illustrated arrangement located in planes which are right angles to one another. The panels 10 and 11 in the preferred form are manufactured from acrylic sheet with the side edges, which extend laterally between the outer and inner surfaces of the panels 10 and 11, profiled to have an edge profile of the form illustrated.

In the drawings the corners of the inner surfaces of panels 10 and 11 are shown as physically contacting each other at interface 13. This interface is for the purposes of illustration, thus it is shown somewhat exaggerated in its length. The interface may be extremely small or may not even exist i.e. the opposing surfaces which form the interface 13 may actually be spaced apart so that no physical contact occurs.

Figure 11:
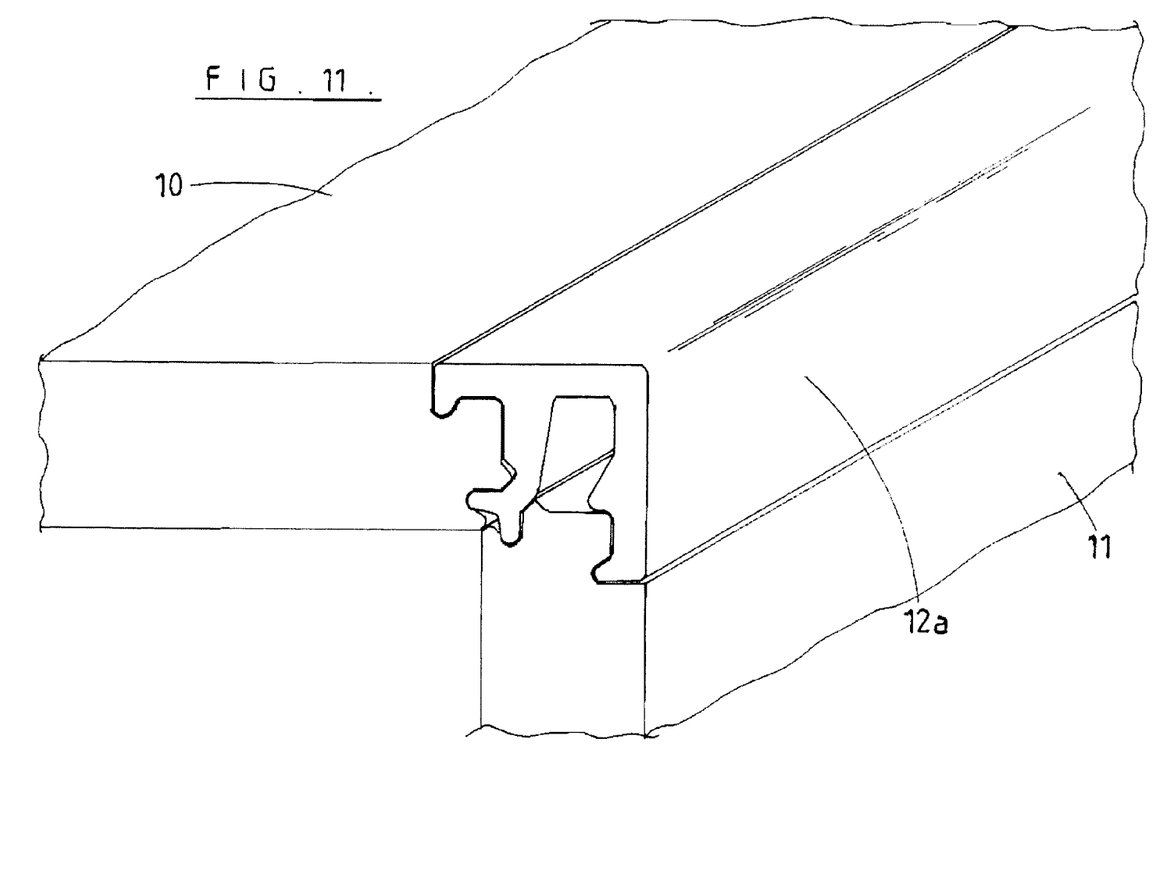
FIG. 11 is a perspective view of a joint arrangement.

In the arrangement shown in FIG. 1 the outer surface 14 of the elongate joiner element 12 is curved so as to provide a curved transition from the outer or face surface of panel 10 to the outer or face surface of panel 11. However, with the arrangement shown in FIG. 2 and FIG. 11 the joiner element 12a is of a more angular cross section at its outer surface where a first surface 15 extends parallel to the outer surface of panel 10 and a second surface 16 extends parallel to the outer surface of panel 11. The actual physical external appearance of the joiner element 12 or 12a could take on other appearances such as a plurality of facets or a more complex curved shape.

Projecting inwardly (relative to outer surfaces 14 or 15 and 16 as the case may be) are a pair of ribs 17 and 18 which respectively engage in corresponding recesses, grooves, channels or the like e.g., grooves 19 and 20 formed in the outer surface of each panel 10 and 11. A groove 19 is thus formed adjacent profiled edge 21 and a groove 20 is formed adjacent profiled edge 21a. In contrast to the grooves used in the edge profiling of U.S. Pat. No. 6,375,284 these grooves are shallow and therefore do not provide a profiling where damage, breakage etc. to the profile edge is a possibility.

Figure 10:
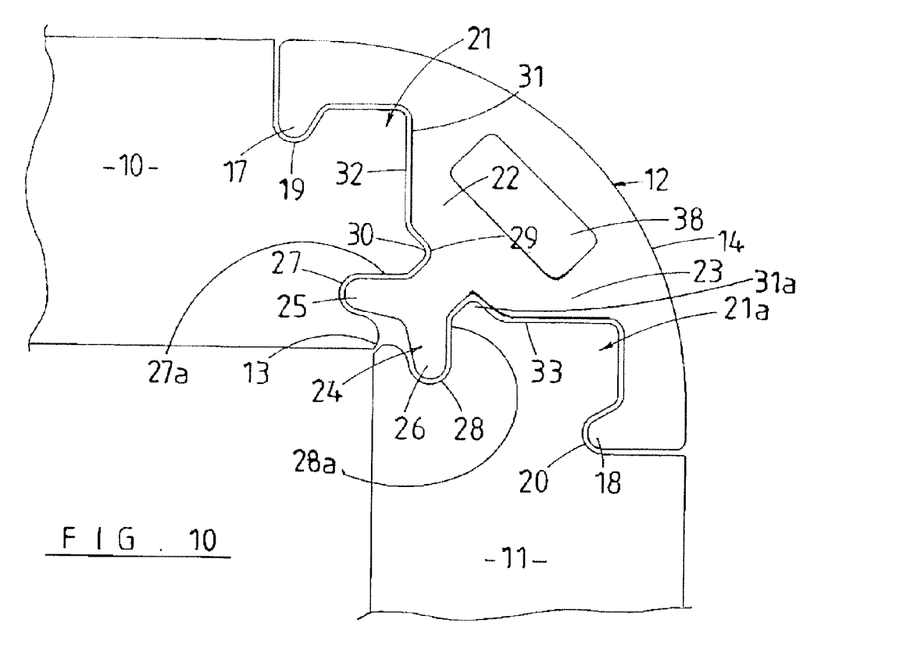
FIG. 10 is a view similar to FIG. 2 but having a further embodiment of the joiner element.

Projecting inwardly from the inside surface of the joiner element 12/12a is a major spine 22 and a minor spine 23. This arrangement of two separate spines has been adopted so that a tube die for extrusion of the joiner element 12/12a is not required. However, as shown in FIG. 10 the major and secondary spines 22/23 can be connected if the joiner element is extruded by using a tube die. With such an arrangement there will effectively be a single spine.

Figure 2:
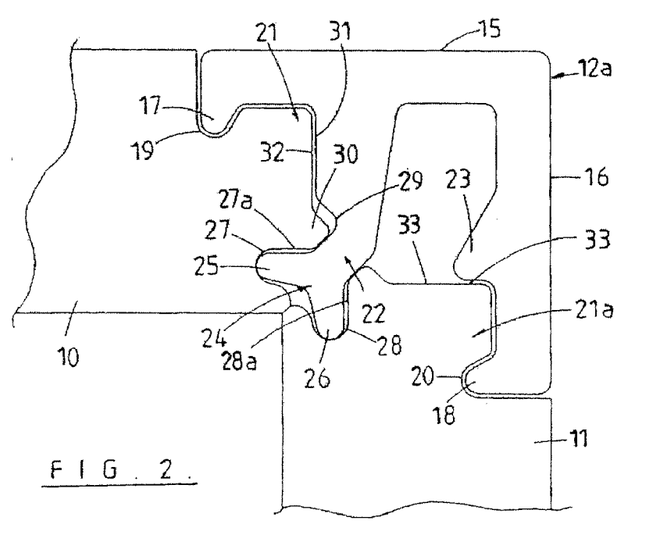
FIG. 2 is a similar view but of an alternative embodiment of the invention where a more angular joiner element is used.
Figure 3:
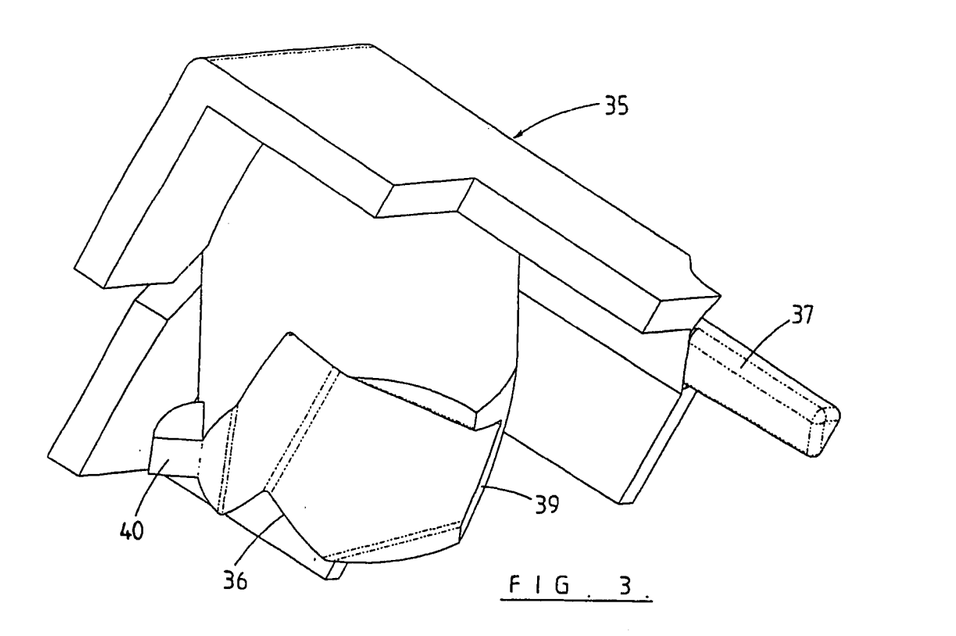
FIG. 3 is a perspective view of a retainer suitable for use with the arrangement shown in FIG. 2, FIGS. 4-7 are further views of the retainer as shown in FIG. 3.
Figure 4:
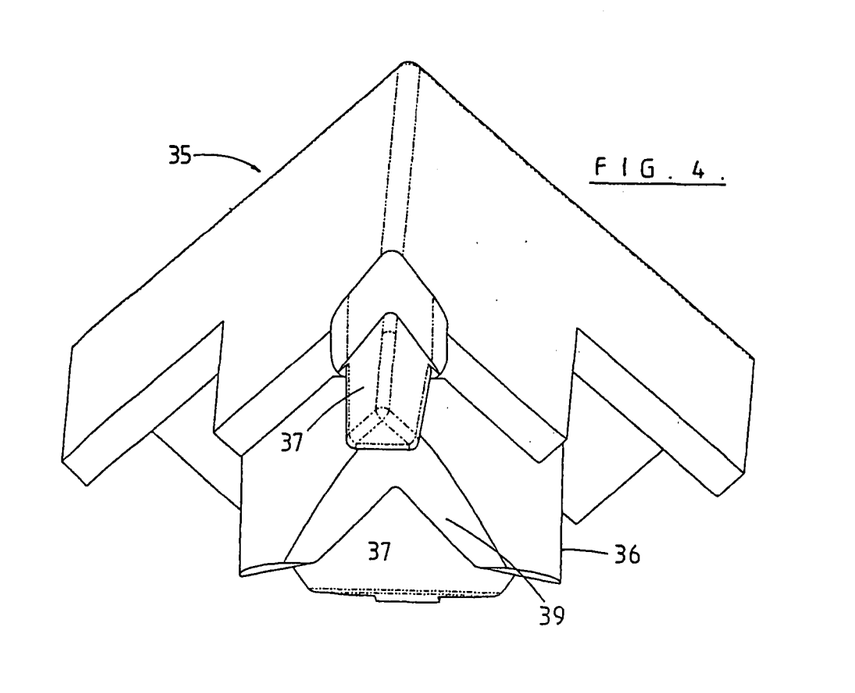
Figure 5:
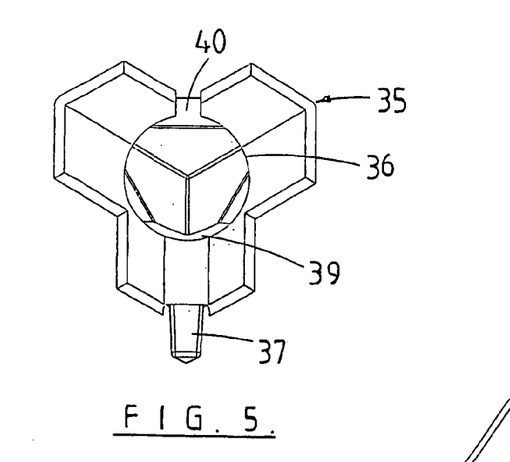
Figure 6:
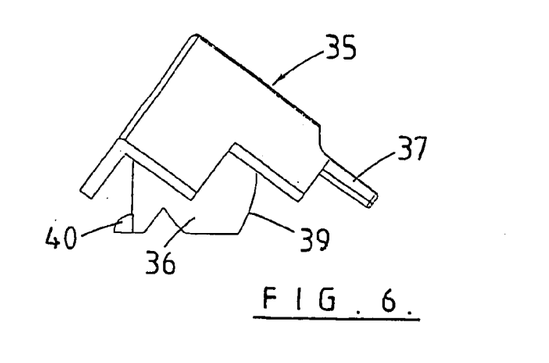
Figure 7:
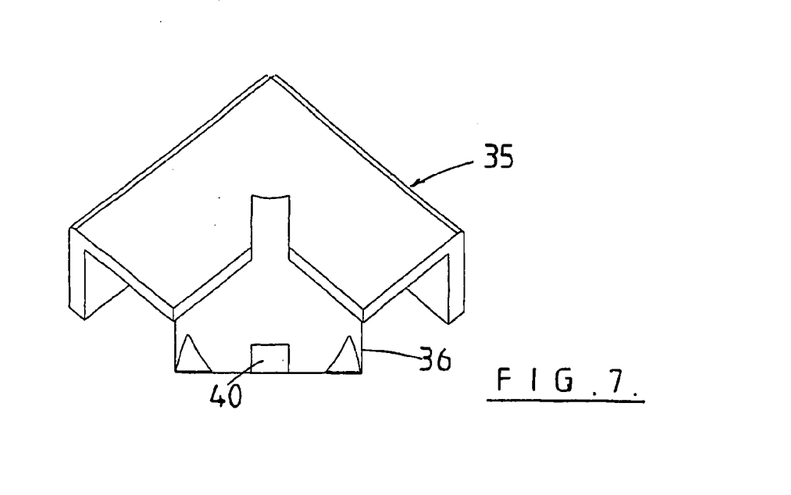

The major spine 22 extends to an enlarged distal end 24 which, as shown in FIG. 1, provides a pair of outwardly or laterally projecting projections or ribs 25 and 26. These ribs 25 and 26 engage in correspondingly shaped grooves 27 and 28 formed in the respective profiled edges 21 and 21a of panels 10 and 11. Each groove 27 forms a shoulder, relative to the outer or face surface of the panel, and behind which the rib 25/26 engages. As shown in FIGS. 1 and 2 grooves 27 and 28 form shoulders 27a and 28a behind which (relative to the outer surface of the panels 10/11) the rib 26/26 engages.

The major spine 22 is also provided with an indent 29 into which engages a projection 30 formed in the profiled edge of panel 10. A like projection 31a of panel 11 fits into a shaped portion of the major spine 22 but would if the major and minor spines 22 and 23 were coupled, similarly fit into a recess.

As can be seen in FIG. 1 the major spine 22 is located within an area between the profiled edges 21 and 21a and has a flat or abutment surface 31 which engages against a flat or engagement surface 32 of the profiled edge of the panel 10. Similarly minor spine 23 forms an abutment surface which engages against flat or engagement surface 33 of the profiled edge of panel 11.

The joiner element 12/12a therefore keys onto the profiled edges of panels 10 and 11 as shown in FIG. 1. Thus according to the present invention there is no requirement for face to face contact of the respective edges of panels 10 and 11 in order to obtain a secure a robust joint. Because there is no requirement for deep grooves to accept projections from the joiner element the profiled edges of the acrylic panels are not prone to damage or failure. Furthermore, the high degree of accuracy required to ensure the interface between the edges of the panels as required in U.S. Pat. No. 6,375,284 is no longer a requirement.

Figure 9:
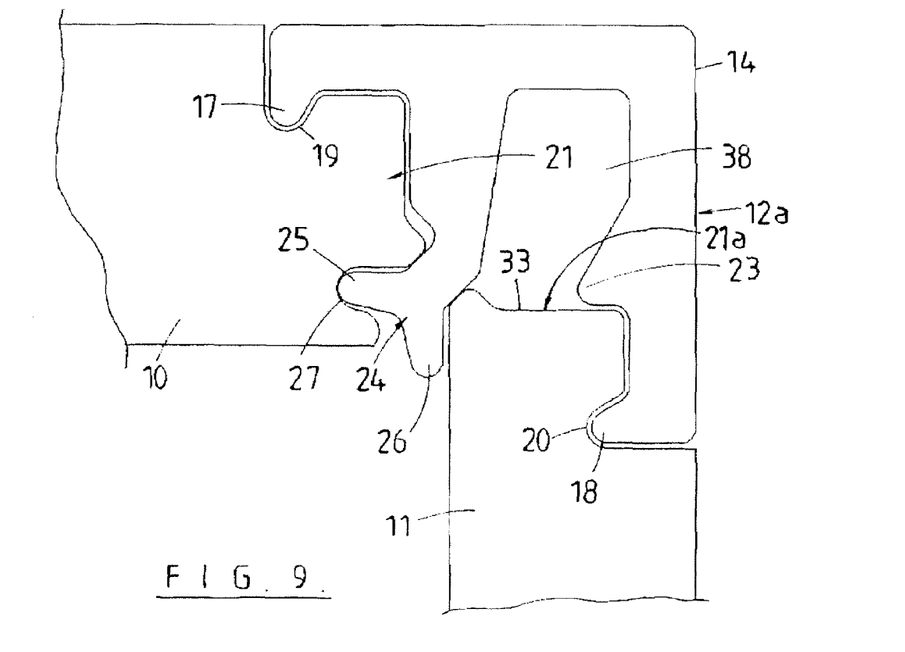
FIG. 9 is a view similar to FIG. 2 but showing how panels or elements of different cross-sectional thickness can be joined together by a joiner element.

Because the panels 10 and 11 of the present invention do not need to fit face to face as an interface (e.g. such as interface 13) the panels 10 and 11 can, with suitable adjustment of the profiling and the configuration of the joiner element be located at angles other than 90° as illustrated. Also as shown in FIG. 9 panels of unequal thickness can also be joined. This illustrates how the dimension of the panel from outer surface to inner surface is not critical to achieving a successful joint because irrespective of the dimension from outer surface to inner surface the distance of the shoulder 27a/28a to the outer surface is the same.

Figure 8:
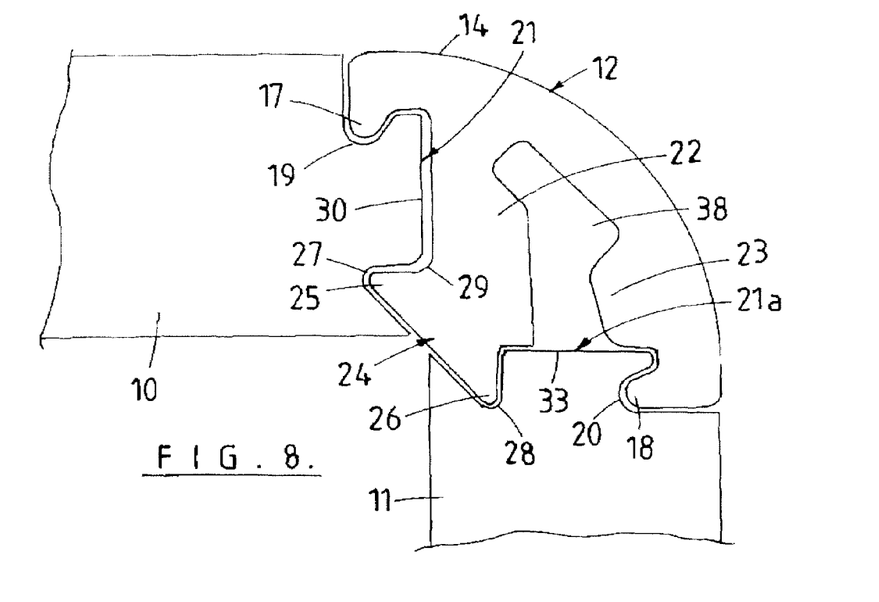
FIG. 8 is a view similar to FIGS. 1 and 2 but showing yet a further form of the invention.

It is also possible with the present invention to key the joiner element 12/12a onto one panel and then slide the other panel onto the joiner element. This results in the possibility of being able to slide one of the panels relative to the remainder of the cabinet after a pair of the retainers are removed from opposed adjacent corners to provide a means of opening the cabinet. Generally one of the retainers would be the lockable retainer. Such an arrangement is shown in FIG. 8 where the spines 22 and 32 are "fatter". As a result the edges of panels do not overlap thereby permitting the sliding action referred to above to occur.

In FIGS. 3-7 there is shown a retainer for use with the more angular joiner element shown in FIG. 2. As with the joiner elements disclosed in U.S. Pat. No. 6,375,284 this retainer element has a main body 35 which is configured to fit at the corner of the cabinet and provide a smooth transition to the abutting end of a joiner element. A shaft 36 is shaped to fit into openings formed at each corner and a tongue 37 to engage into the space 38 of joiner element 12/12a in the same manner as disclosed in U.S. Pat. No. 6,375,284. The shaft 36 includes a chamfered surface 39 to facilitate the insertion of the shaft into the opening as a consequence of an outwardly projecting radial projection 40 which extends from the side of the shaft (as disclosed in U.S. Pat. No. 6,375,284).

The joining arrangement according to the present invention thus provides a strong joint and obviates the need for edge profiling of the panels in a manner which can either lead to weakness of the joint or be prone to damage. Also a greater degree of accuracy is achieved as face to face engagement of adjacent panels is not required. Furthermore the manner of keying the joiner element onto the profiled edges of the panels does facilitate easier fitment of the joiner element to the panels. Also panels of unequal thickness can be joined together.

The invention claimed is:

1. A joint construction comprising:
   first and second structural elements with adjacent edges of the first and second structural elements being joined by an elongate joiner element, each structural element includes an outer surface, an inner surface and an edge extending laterally between the outer and inner surfaces, each edge being profiled to form a shoulder spaced from both the outer and inner surfaces, the joint construction including a groove in the outer surface of each structural element said groove being spaced from and extends parallel to the profiled edge,
   the elongate joiner element includes first and second projections, the first projection being engaged in the groove in the first structural element and the second projection engaged in the groove of the second structural element, the elongate joiner element further including a spine which is located within an area between the profiled edges of the first and second structural elements, a lateral projection projecting from the spine and engaged behind the shoulder relative to the outer surface of the first structural element.

2. The joint construction as claimed in claim 1 wherein the profiled edge of each of the first and second structural elements has an engagement surface and the joiner element has first and second abutments which are respectively engaged with said engagement surface of the first and second structural elements.

3. The joint construction as claimed in claim 2 wherein the lateral projection is at a distal end of the spine.

4. The joint construction as claimed in claim 3 wherein the spine has a second lateral projection which is engaged with the second structural element.

5. The joint construction of claim 4, wherein the joiner elements being retained against sliding movement by a retainer element located in each corner of a demountable case including panels, the panels being joined edge to edge by the joint construction at which the ends of at least two joiner elements are located.

6. The joint construction of claim 5, wherein at least one of the retainer elements is lockable in the corner in which it is located.

7. The joint construction of claim 5 wherein each joiner element includes a space and each of the retainer elements has a tongue which is engaged in said space of one of the joiner elements.

8. The joint construction of claim 7 wherein each retainer element includes a main body configured to fit at said corner and form a smooth transition with the ends of joiner elements to which the retainer element abuts.

9. The joint construction of claim 8 wherein the retainer element further includes a shaft which is engaged in an opening formed in said corner.

10. The joint construction of claim 9 wherein the shaft includes a chamfered surface at a distal end thereof.

11. The joint construction of claim 10 wherein the shaft includes a projection which extends outwardly from a side of the shaft.

12. The joint construction as claimed in claim 4 wherein the second lateral projection is engaged behind (relative to the outer surface of the second structural element) the shoulder formed in the profiled edge of the second structural element.

13. The joint construction as claimed in claim 4 or 12 wherein the second lateral projection is located at the distal end of the spine.

14. The joint construction as claimed in claim 1 wherein the spine includes a distal end with at least one said lateral projection thereat.

15. The joint construction as claimed in claim 14 wherein the distal end has two oppositely disposed lateral projections.

16. The joint construction as claimed in claim 1 wherein said spine includes an indented portion in which is engaged a projecting portion of an adjacent profiled edge of the first structural element.

17. The joint construction as claimed in claim 16 wherein said indented portion is located adjacent said lateral projection.

18. The joint construction as claimed in claim 17 wherein a surface of the spine adjacent said indented portion engages with a surface of the profiled edge of the first structural element.

19. The joint construction as claimed in claim 14 or 18 wherein the elongate joiner element further includes:
   an abutment surface which is engaged with a surface of the profiled edge of the second structural element adjacent the outer surface of the other of the structural elements.

20. The joint construction as claimed in claim 1 wherein during assembly of the joint arrangement the joiner element is slidingly engageable with the profiled edges, grooves and shoulder of the first and second structural elements.

21. The joint construction as claimed in claim 1 wherein the first and second structural elements are each in the form of a panel.

22. The joint construction as claimed in claim 21 wherein each structural panel is formed from a plastic material and the joiner element is of extruded construction.

23. The joint construction as claimed in claim 1 wherein the joiner element includes an outer surface which forms a transition between face surfaces of the first and second structural elements.

24. The joint construction as claimed in claim 23 wherein the outer surface is curved or angular.

25. A kit set of parts for assembling a demountable structure, the kit set comprising:
   a first structural element, a second structural element, each of said first and second structural elements including an outer surface, an inner surface and an edge extending laterally between the outer and inner surfaces, each outer surface having a groove which is spaced from and extends parallel to the profiled edge,
   a shoulder is formed in the profiled edge of the first structural element adjacent the inner surface and extends longitudinally along the profiled edge, and
   an elongate joiner element which has first and second projections, a spine and a lateral projection projecting from the spine, the elongate joiner element being slidingly engageable with the first and second structural elements when the profiled edges thereof are placed adjacent one another such that the first and second projections engage within the respective grooves of the first and second structural elements and the lateral projection engages behind (relative to the outer surface) of the shoulder.

26. The kit set of parts as claimed in claim 25 wherein the elongate joiner element has first and second abutments which engage in the demountable structure with surfaces of respective profiled edges of the first and second structural elements.

27. The kit set of parts as claimed in claim 26 wherein the spine has a second lateral projection which is engageable behind a shoulder in the profiled edge of the second structural element.

28. The kit set of parts as claimed in claim 27 wherein each of the first and second structural elements is a panel.

29. The kit set of parts as claimed in claim 28 wherein the panel is made of plastic material.

30. A joint construction comprising:
   two structural elements with adjacent profiled edges being joined by a joiner element, each structural element having an outer surface and an inner surface, the profiled edge extending laterally to the outer and inner surfaces,
   a groove formed in the outer surface of each structural element, said groove being spaced from and parallel to the profiled edge, the joint construction including:
   the joiner element which has projections, each engaged in said groove in the outer surface of a respective one of the structural elements, the joiner element further having a spine which is located between the profiled edges of the structural elements and the spine includes at least one lateral projection which is engaged in a groove formed in a profiled edge.

31. The joint construction as claimed in claim 30, wherein the spine includes a distal end with at least one said lateral projection thereat.

32. The joint construction as claimed in claim 31, wherein the distal end has two oppositely disposed lateral projections each engaged in a respective one of the profiled edges of the structural elements.

* * * * *